Feb. 19, 1946.  C. E. KAUFMAN  2,395,331
TREATMENT OF WATER FOR BOILER FEED
Filed June 21, 1943
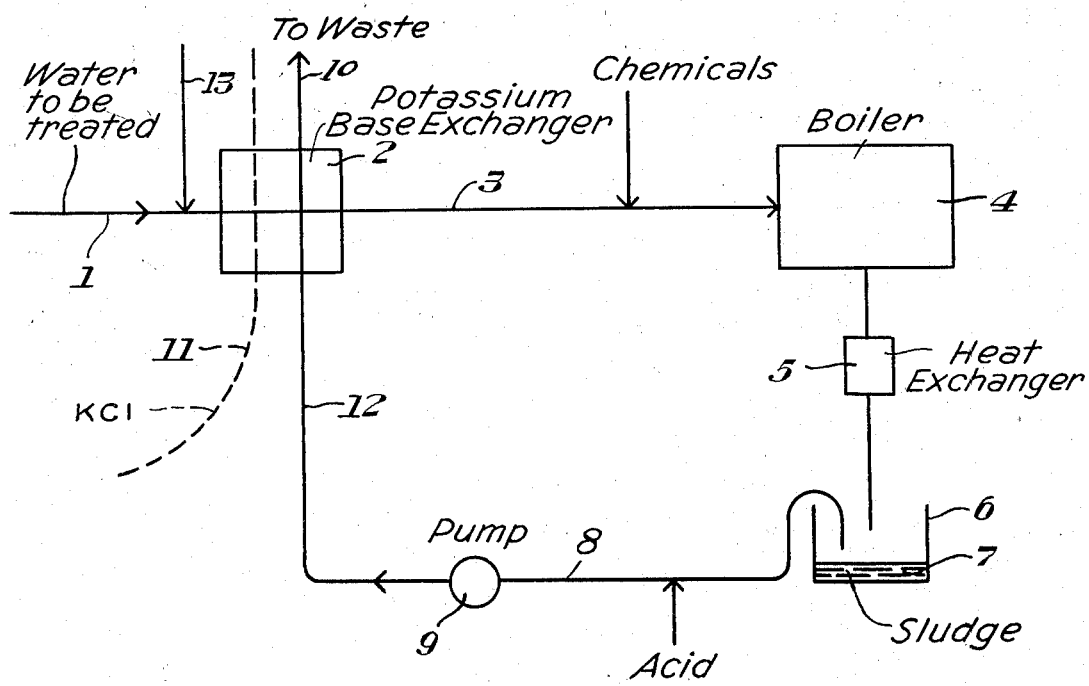
INVENTOR
Charles E. Kaufman
by
Stebbins and Blenko.
His Attys.

Patented Feb. 19, 1946

2,395,331

UNITED STATES PATENT OFFICE 2,395,331

TREATMENT OF WATER FOR BOILER FEED

Charles E. Kaufman, Pittsburgh, Pa., assignor to Hall Laboratories, Inc., Pittsburgh, Pa., a corporation of Pennsylvania Application June 21, 1943, Serial No. 491,624

6 Claims. (Cl. 210—24)

This invention relates to the treatment of water for boiler feed. It relates more particularly to the treatment of water for boiler feed wherein the boiler water has such a ratio of potassium ion to sodium ion that the formation of scale, particularly siliceous scale deposits in the boiler is greatly minimized or prevented, and wherein when steam generated by the boiler is used for actuating a turbine, deposition of siliceous scale on the turbine blades is also minimized or prevented.

An object of the invention is to recover potassium ion from boiler blowdown for recycling in the system in order to aid in maintaining the desired ratio of potassium ion to sodium ion in the boiler water so as to inhibit the formation of siliceous scale. A further object is to separate the desired potassium ion from undesired ions present in the boiler blowdown.

The drawing is a diagram illustrating a preferred manner of carrying out my process.

The water for boiler feed generally contains sodium, calcium and magnesium as the predominant cations, and sulphate, chloride, bicarbonate and/or carbonate, and silicate as the predominant anions. In my process, the water 1 is fed through a potassium base-exchange material 2 (which ordinarily will contain some sodium) wherein the calcium and magnesium are substantially all removed from the water and fixed by the base-exchange material, some of the sodium is removed and fixed by the base-exchange material and potassium ion is given up to the effluent 3. This effluent 3 from the base exchanger is fed to the boiler 4. Chemicals for controlling the ionic equilibrium in the boiler water to minimize scale, corrosion or embrittlement, for example, phosphate and sulphite, may be introduced into the water between the base exchanger and the boiler, or may be fed directly into the boiler. These chemicals may be either sodium or potassium or both sodium and potassium salts as may be desirable to maintain the optimum ratio of potassium ion to sodium ion in the boiler water for the prevention of siliceous deposits in the boiler and turbine. If such considerations dictate the use of potassium chemicals these likewise may provide the necessary make-up of potassium ion to offset the unavoidable losses of this ion from the system.

The concentration of salts in the boiler water is much larger than that in the water fed to the base exchanger, the concentration in the boiler being generally at least about ten times as great. To minimize carryover of boiler water in the steam and to remove precipitated sludge from the boiler, a portion of the concentrated boiler water is blown down either intermittently or continuously. The blow-down passes through a heat exchanger 5 which lowers its temperature and is collected in a suitable container 6 wherein the sludge 7 is allowed to collect. The concentrated boiler water 8 containing potassium ions but practically no calcium or magnesium ions and substantially free of sludge has its alkalinity reduced by treatment with a suitable acid material in order to minimize attack on a base-exchange material through which the concentrated boiler water is subsequently passed. The concentrated boiler water after having been treated with the acid material is pumped by a pump 9 and passes through the spent base-exchange material 2. In the exchanger the potassium of the concentrated solution is exchanged for calcium, magnesium, and sodium previously fixed by the exchange material from the feed water. The calcium, magnesium and sodium in the water 10 flowing from the exchanger is allowed to go to waste.

In order to compensate for unavoidable loss of potassium ion in carrying out the process it is necessary to supply potassium ion to the system. Insofar as maintaining the desired concentration of potassium ion in the boiler water is concerned, any convenient potassium salt whose anion is not objectionable in the boiler water may be added to any point in the system. In cases where phosphate, sulphite, chloride, hydroxide or other anion is to be supplied to the boiler feed water, the corresponding potassium salt or salts may be introduced at any convenient point in the boiler-feed line following the base exchanger 2 or directly into the boiler 4. Where the desired anions are to be supplied as sodium salts or additional potassium ions must be introduced, a prefered manner of adding the potassium ion to the system is by passing a solution of potassium chloride through the base exchanger as indicated by the reference numeral 11, or by combining the stream 11 with the solution 12 and thereafter passing them through the exchanger. In either case the potassium salt solution 11 supplements the use of the concentrated boiler water 12 in the regeneration of the exchanger. Of course, during regeneration of an exchanger, no water for feeding the boiler is passed through the exchanger which is being regenerated.

Instead of employing a heat exchanger for cooling the water removed from the boiler, the water may be cooled by any other suitable means such, for example, as a flash tank. Instead of settling the sludge 7 in the container 6 any other suitable means of separating the suspended material from the water may be employed such, for example, as filtration.

Under certain conditions of operating the boiler the alkalinity of the boiler water is such that it may be unnecessary to treat the water removed from the boiler with acid material before passing it through the base exchanger.

In describing the invention thus far we have assumed that the effluent 3 from the base exchanger does no contain a substantial amount of sodium ion. In many cases it will not be necessary to eliminate sodium ion substantially completely from the boiler water. In fact, it may be desirable to have sodium ion present in appreciable amounts but the ratio of potassium ion to sodium ion by weight in the boiler water should be not less than about 0.8. When water of such a ratio is removed from the boiler and passed through the base-exchange material 2 to regenerate it, both potassium and sodium will be fixed by the base-exchange material, liberating calcium and magnesium which pass off to waste. When the water to be supplied to the boiler is then passed through this regenerated potassium-sodium base exchanger, calcium and magnesium ions will be removed substantially completely but the effluent will contain both potassium and sodium ions.

It may be unnecessary to pass all of the water destined for boiler feed through the base-exchange material. For example, part of the make-up may be introduced directly into the boiler without any preliminary treatment, any objectionable constituents being taken care of by proper addition of chemicals for internal conditioning within the boiler. Whatever the desired ratio of potassium ion to sodium ion in the boiler water may be, but particularly when it is desired to maintain a high value for this ratio, or when the water supply is high in bicarbonate ion, part of the make-up water may be passed through a hydrogen exchanger which will remove sodium substantially completely as well as calcium and magnesium, and the resulting acid effluent may then be mixed with the portion of the make-up passed through the base-exchange material 2.

The invention is not limited to the preferred embodiment or manner of practicing the invention, which have been given merely by way of illustration, but may be otherwise embodied or practiced within the scope of the following claims.

I claim:

1. In the maintenance of potassium conditioning of boiler water, the steps which comprise removing a portion of concentrated boiler water containing potassium ion, separating solid material suspended in the water removed from the boiler, passing the concentrated boiler water through spent base-exchange material containing calcium, magnesium, and sodium to regenerate the spent base-exchange material to potassium base-exchange material, passing water for boiler feed containing calcium, magnesium, and sodium ion, and having a lower total ion concentration than the concentrated boiler water through said potassium base exchanger, thereby producing an effluent containing potassium ion, supplying the effluent to a boiler wherein concentration of ions occur and adding potassium salt to the system from time to time as necessary to compensate for unavoidable losses of potassium ion.

2. In the maintenance of potassium conditioning of boiler water, the steps which comprise removing a portion of concentrated boiler water containing potassium ion, lowering the alkalinity of the water to minimize attack on a base-exchange material, passing the concentrated boiler water through spent base-exchange material containing calcium, magnesium, and sodium to regenerate the spent base-exchange material to potassium base-exchange material, passing water for boiler feed containing calcium, magnesium, and sodium ion, and having a lower total ion concentration than the concentrated boiler water through said potassium base exchanger, thereby producing an effluent containing potassium ion, supplying the effluent to a boiler wherein concentration of ions occur and adding potassium salt to the system from time to time as necessary to compensate for unavoidable losses of potassium ion.

3. In the maintenance of potassium conditioning of boiler water, the steps which comprise removing a portion of concentrated boiler water containing potassium ion, passing the concentrated boiler water through spent base-exchange material containing calcium, magnesium, and sodium to regenerate the spent base-exchange material to potassium base-exchange material, passing water for boiler feed containing calcium, magnesium, and sodium ion, and having a lower total ion concentration than the concentrated boiler water through said potassium base exchanger, thereby producing an effluent containing potassium ion, and supplying the effluent to a boiler wherein concentration of ions occur, and adding potassium salt to the system from time to time as necessary to compensate for unavoidable losses of potassium ion.

4. In the maintenance of potassium conditioning of boiler water, the steps which comprise removing a portion of concentrated boiler water containing potassium ion, passing the concentrated boiler water through spent base-exchange material containing calcium, magnesium, and sodium to regenerate the spent base-exchange material to potassium base-exchange material, passing water for boiler feed containing calcium, magnesium, and sodium ion, and having a lower total ion concentration than the concentrated boiler water through said potassium base exchanger, thereby producing an effluent containing potassium ion, supplying the effluent to a boiler wherein concentration of ions occur, and adding potassium salt to the system from time to time as necessary to compensate for unavoidable losses of potassium ion, by passing through the base exchanger potassium salt in addition to the concentrated water removed from the boiler.

5. In the maintenance of potassium conditioning of boiler water, the steps which comprise removing a portion of concentrated boiler water containing potassium ion, reducing its temperature, passing the concentrated boiler water through spent base-exchange material containing calcium, magnesium, and sodium to regenerate the spent base-exchange material to potassium base-exchange material, passing water for boiler feed containing calcium, magnesium, and sodium ion, and having a lower total ion concentration than the concentrated boiler water through said potassium base exchanger, thereby producing an effluent containing potassium ion, supplying the effluent to a boiler wherein concentration of ions occur and adding potassium salt to the system from time to time as necessary to compensate for unavoidable losses of potassium ion.

6. In the maintenance of potassium conditioning of boiler water, the steps which comprise removing a portion of the concentrated boiler water, the boiler water having a ratio by weight of potassium ion to sodium ion of at least about 0.8, passing the concentrated boiler water through spent base-exchange material containing calcium, magnesium, and sodium ion to regenerate the spent base-exchange material to potassium-sodium base-exchange material, passing water for boiler feed and containing calcium, magnesium, and sodium ion and having a lower total ion concentration than the concentrated boiler water through said potassium-sodium base exchanger, passing water coming from the potassium-sodium base exchanger to a boiler wherein concentration of ions occurs, and the weight ratio of potassium ion to sodium ion in the boiler water is maintained at at least about 0.8.

CHARLES E. KAUFMAN.